(12) United States Patent
Wang et al.

(10) Patent No.: US 9,966,803 B2
(45) Date of Patent: May 8, 2018

(54) RECEIVER REMOVAL DETECTION IN WIRELESS CHARGING SYSTEMS

(71) Applicant: FREESCALE SEMICONDUCTOR, INC., Austin, TX (US)

(72) Inventors: Dechang Wang, Suzhou (CN); Gang Li, Shanghai (CN); Li Wang, Suzhou (CN); Ping Zhao, Shanghai (CN)

(73) Assignee: NXP USA, INC., Austin, TX (US)

( * ) Notice: Subject to any disclaimer, the term of this patent is extended or adjusted under 35 U.S.C. 154(b) by 220 days.

(21) Appl. No.: 15/196,057

(22) Filed: Jun. 29, 2016

(65) Prior Publication Data

US 2017/0223637 A1    Aug. 3, 2017

(30) Foreign Application Priority Data

Feb. 1, 2016  (CN) .......................... 2016 1 0068940

(51) Int. Cl.
| | |
|---|---|
| *H02J 50/00* | (2016.01) |
| *H02J 50/90* | (2016.01) |
| *H04B 5/00* | (2006.01) |
| *H04W 8/00* | (2009.01) |
| *H02J 7/02* | (2016.01) |
| *H02J 50/10* | (2016.01) |
| *H04W 52/22* | (2009.01) |

(52) U.S. Cl.
CPC .............. *H02J 50/90* (2016.02); *H02J 7/025* (2013.01); *H02J 50/10* (2016.02); *H04B 5/0037* (2013.01); *H04W 4/80* (2018.02); *H04W 8/005* (2013.01); *H04W 52/228* (2013.01)

(58) Field of Classification Search
CPC ............ H02J 50/90; H02J 50/10; H04W 4/80
See application file for complete search history.

(56) References Cited

U.S. PATENT DOCUMENTS

| | | | |
|---|---|---|---|
| 2009/0021219 A1* | 1/2009 | Yoda ........................ | H02J 7/025 320/137 |
| 2013/0154557 A1 | 6/2013 | Lee | |
| 2014/0084857 A1 | 3/2014 | Liu | |
| 2014/0247004 A1* | 9/2014 | Kari ........................ | H02J 5/005 320/106 |
| 2015/0162779 A1* | 6/2015 | Lee ....................... | H04B 5/0037 320/108 |
| 2015/0318730 A1* | 11/2015 | Bhargava ................ | H02J 5/005 320/108 |
| 2016/0336809 A1* | 11/2016 | Gluzman ............. | A61N 1/3756 |

* cited by examiner

*Primary Examiner* — Daniel Cavallari
(74) *Attorney, Agent, or Firm* — Charles E. Bergere

(57) ABSTRACT

A wireless charging system has a transmitter and a receiver. The transmitter has (i) a TX coil that wirelessly transfers power to the receiver and (ii) TX circuitry that powers the TX coil and detects receiver removal by comparing TX input power and TX power loss. The TX circuitry can determine (1) TX input power as the product of sampled TX input current and voltage and (2) TX power loss using a mapping based on sampled TX coil current. When the receiver is present, the difference between TX input power and TX power loss has a first value and when the receiver is removed, the difference has a second, lesser value. The transmitter detects removal of the receiver by determining when the difference decreases below a specified threshold level. By frequently generating and analyzing the difference, the transmitter can quickly detect receiver removal and safely power down the TX coil.

20 Claims, 3 Drawing Sheets

RECEIVER REMOVAL DETECTION IN WIRELESS CHARGING SYSTEMS

BACKGROUND

The present invention relates to wireless charging systems and, more particularly, to techniques for detecting when the receiver has been removed from a wireless charging system.

A conventional wireless charging system comprises a transmitter (TX) and a receiver (RX), where the transmitter wirelessly charges the receiver. In particular, the transmitter comprises TX circuitry that provides electrical power to a TX coil. The receiver comprises an RX coil that couples inductively with the TX coil when the RX coil is brought near the TX coil, such that electrical energy is transmitted from the TX coil to the RX coil to power and/or charge the RX circuitry, which typically includes a rechargeable battery.

In a conventional wireless charging system, the receiver periodically transmits (via the RX coil) short-range, wireless communication packets to the transmitter (via the TX coil), e.g., every 200-500 msec, that indicate the control error and output power. As long as the transmitter receives such communication packets from the receiver, the transmitter knows that the receiver is still present. If the RX coil is removed from the TX coil, then the transmitter will no longer detect the communication packets from the receiver. If the transmitter fails to receive a communication packet from the receiver for a specified number of continuous cycles (e.g., 5-6 cycles), then the transmitter determines that the receiver is no longer present, and the transmitter responds by powering down the TX coil.

After the receiver has been removed, but before the transmitter powers down the TX coil (e.g., 1-2 seconds later), if a different receiver is placed near the TX coil, then that newly placed receiver may be damaged by the existing high-power state of the TX coil. Furthermore, during that same interval, the radiating TX coil may cause EMC (electromagnetic compatibility) issues whether or not a different receiver is presented. Thus, it would be advantageous to have a transmitter that quickly detects removal of a receiver.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the invention is a method for detecting removal of a receiver (RX) from a wireless charging system comprising a transmitter (TX) having a TX coil. The method comprises (a) determining TX input power applied to the transmitter; (b) determining TX power loss within the transmitter; and (c) detecting the removal of the receiver based on a comparison of the determined TX input power and the determined TX power loss.

In another embodiment, the invention is a transmitter (TX) for a wireless charging system. The transmitter comprises a TX coil that wirelessly transfers power to a receiver of the wireless charging system and TX circuitry that powers the TX coil. The TX circuitry detects removal of the receiver by (a) determining TX input power to the transmitter; (b) determining TX power loss within the transmitter; and (c) detecting the removal of the receiver based on a comparison of the determined TX input power and the determined TX power loss.

In yet another embodiment, the invention is a wireless charging system comprising a transmitter (TX) and a receiver (TX) that is configured to receive power wirelessly from the transmitter. The transmitter detects removal of the receiver by (a) determining TX input power applied to the transmitter; (b) determining TX power loss within the transmitter; and (c) detecting the removal of the receiver based on a comparison of the determined TX input power and the determined TX power loss.

Figure 1:
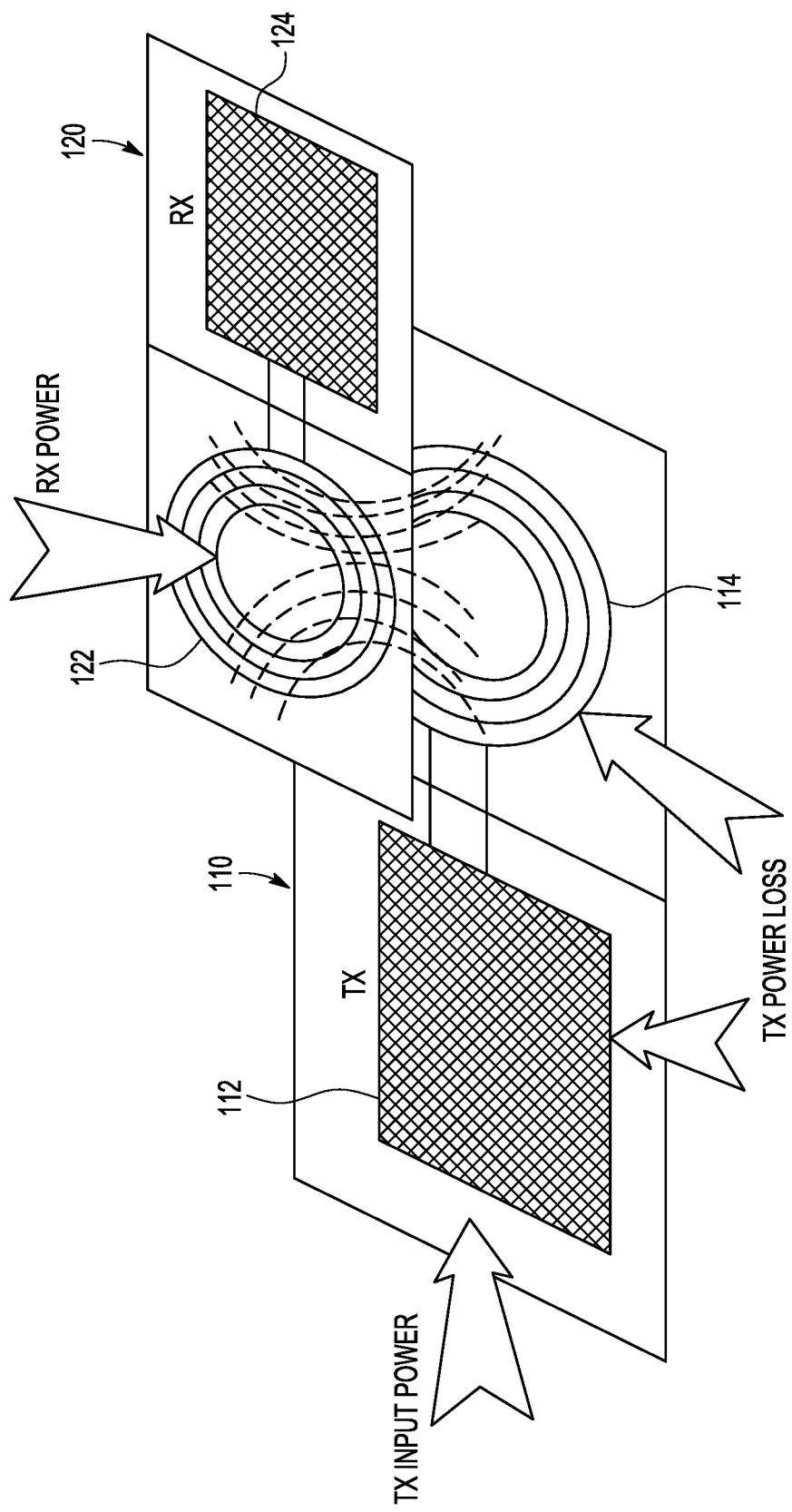
FIG. 1 is a schematic block diagram illustrating a wireless charging system according to one embodiment of the present invention.

FIG. 1 is a schematic diagram representing a wireless charging system 100 of the present invention. The wireless charging system 100 comprises a transmitter (TX) 110 and a receiver (RX) 120, where the transmitter 110 wirelessly charges the receiver 120. In particular, the transmitter 110 comprises TX circuitry 112 that provides electrical power to a TX coil 114. The receiver 120 comprises an RX coil 122 that couples inductively with the TX coil 114 when the RX coil 122 is brought near the TX coil 114, such that electrical power is transmitted from the TX coil 114 to the RX coil 122 to power and/or charge the RX circuitry 124, which typically includes a rechargeable battery (not shown).

When the transmitter 110 is wirelessly charging the receiver 120, the electrical power applied to the transmitter 110 (aka the TX input power) is equal to the electrical power transmitted to the receiver 120 (aka the RX power) plus the electrical power dissipated within the transmitter 110 (aka the TX power loss) plus any electrical power transmitted to any foreign objects (FOs) that may also be placed near the TX coil 114 (aka the FO power loss). Note that, in the configuration of FIG. 1, there are no such foreign objects.

During wireless charging, the receiver 120 periodically and wirelessly transmits communication packets to the transmitter 110 informing the transmitter 110 of the RX power level. In addition, the transmitter 110 monitors its TX input power level. If the transmitter 110 determines that the difference between the TX output power (i.e., TX input power level-TX power loss) and the RX power level is too great (e.g., the difference is greater than a specified threshold power level or the ratio of the difference to the TX input power level is greater than a specified threshold ratio value), then the transmitter 110 assumes that most of that difference is due to FO power loss, and the transmitter 110 will power down the TX coil 114, even though the receiver 120 is still present.

Assuming that no foreign object is present (or that one or more foreign objects with only very low FO power loss are present), then the TX input power level will be substantially equal to the RX power level plus the TX power loss. In that case, since typical RX power levels are larger than the minimum RX power under empty load conditions (e.g., more than 300 mW), the TX input power level will be at least 300 mW larger than the TX power loss.

After the receiver 120 has been removed from the transmitter 110, however, the RX power disappears, the TX input power level drops, and the TX input power will then be substantially equal to the TX power loss. By frequently determining information about the various power levels and analyzing the difference between the TX input power and the TX power loss, the transmitter 110 can quickly detect the removal of the receiver 120 and react appropriately, e.g., quickly power down the TX coil 114 and thereby avoid some of the problems of the prior art.

In certain possible implementations, the transmitter 110 is calibrated and pre-programmed with an a priori mapping of the relationship between the current in the TX coil 114 and the TX power loss. Using this a priori mapping, the transmitter 110 can determine the present TX power loss level based on a measurement of the current in the TX coil 114.

Figure 2:
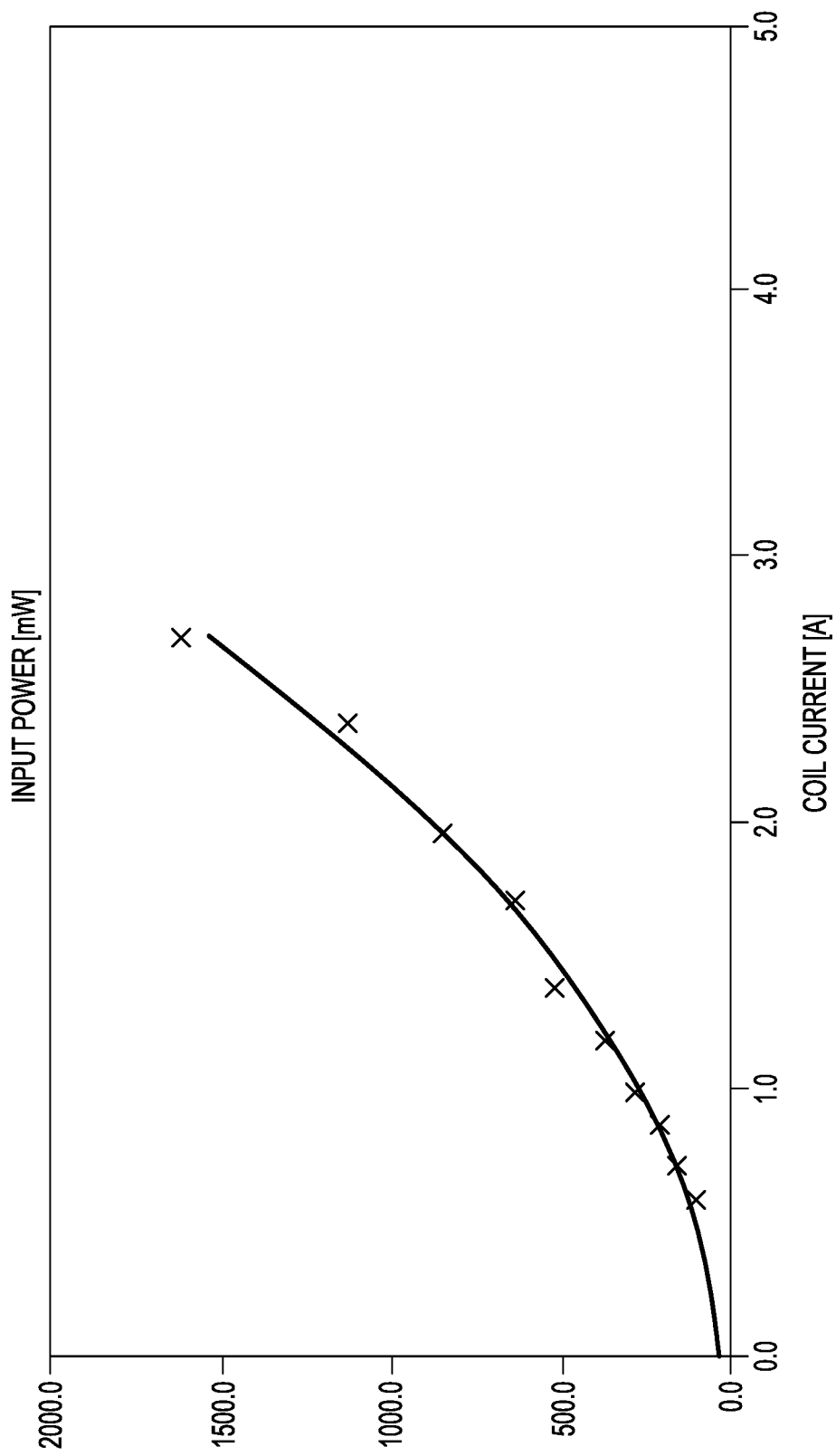
FIG. 2 is a graph showing the relationship between the TX input power and the TX coil current.

FIG. 2 is a graph showing the relationship between the TX input power and the TX coil current. This relationship can be characterized (during an off-line calibration phase) by (i) powering the TX coil 114 at a stable frequency with no receiver 120 and no foreign objects present and (ii) sampling the TX input current to the transmitter 110, the TX input voltage to the transmitter 110, and the current in the TX coil. With this configuration, the TX input power (i.e., the sampled TX input current times the sampled TX input voltage) is equal to the TX power loss, such that the corresponding level of the TX power loss will be determined for the sampled TX coil current. Since the TX power loss varies with the frequency of the TX coil current, the frequency of the power applied to the TX coil 114 can be adjusted to change the TX power loss level and determine the corresponding TX coil current. By varying the frequency step by step over the range of supported frequencies, different points in the graph shown in FIG. 2 can be determined. Alternatively, different data points in the graph can be determined by varying the phase-shift duty cycle or the input voltage. The TX power loss can then be characterized by a quadratic equation in terms of the TX coil current $I_{coil}$ according to Equation (1) as follows:

$$\text{TX power loss} = C_1 \cdot I_{coil}^2 + C_2 \cdot I_{coil} + C_3, \quad (1)$$

where $C_1$, $C_2$, and $C_3$ are constant coefficients determined by applying a suitable curve-fitting operation to the points in FIG. 2. Note that, depending on the actual results and the level of precision required, in alternative implementations, the mapping could be linear or even of some suitable order greater than two.

In any case, during on-line processing, the transmitter 110 can use a mapping based on Equation (1) to determine the present TX power loss level from the most recently sampled TX coil current value. Note that the mapping could be, for example, a lookup table or the actual quadratic equation of Equation (1).

Figure 3:
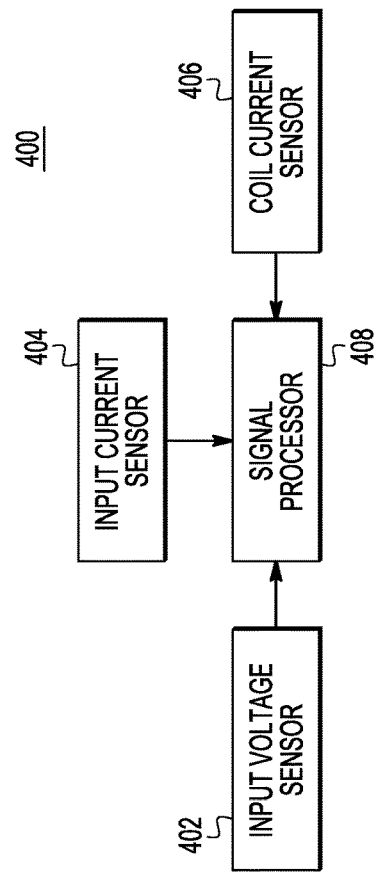
FIG. 3 is a flow chart illustrating the processing performed by the transmitter of FIG. 1 to determine when the receiver has been removed.

FIG. 3 is a flow diagram representing the processing performed by the transmitter 110 of FIG. 1 to determine when the receiver 120 has been removed. In step 302, the processing starts with the transmitter 110 configured to transfer power wirelessly to the receiver 120.

In step 304, the transmitter 110 samples the TX coil current, the TX input current, and the TX input voltage using conventional, suitable current- and voltage-detection circuitry (not shown in FIG. 1), such as a capacitor and resistor-divider circuitry or a current transformer to detect the TX coil current, a current-sensing resistor and amplifier to detect the TX input current, and resistor-divider circuitry to detect the TX input voltage.

In step 306, the transmitter 110 determines (i) the present TX power loss by applying the sampled TX coil current to the mapping based on Equation (1) and (ii) the TX input power by multiplying together the sampled TX input current and the sampled TX input voltage.

In step 308, the transmitter 110 determines the difference between the TX input power and the TX power loss.

In step 310, the transmitter 110 compares the determined difference to a specified threshold value. If the difference is not less than the threshold, then the transmitter 110 determines that the receiver 120 is still present, and processing returns to step 302 to continue transferring power wirelessly to the receiver 120. If, however, the difference is less than the threshold, then, in step 312, the transmitter 110 determines that the receiver 120 has been removed, and the transmitter 110 immediately powers down the TX coil 114.

To limit the occurrence of false positive detections, in some implementations, in order to diminish the impact of noise samples, consecutive difference values can be filtered (e.g., averaged), and the resulting filtered difference values can be compared to the threshold. Other suitable techniques for filtering out spurious outliers can alternatively be applied.

By frequently sampling the current and voltages (e.g., every msec), the transmitter 110 can detect the removal of the receiver 120 more quickly than by using the prior-art technique based on the detected absence of communication packets from the receiver 120.

Figure 4:
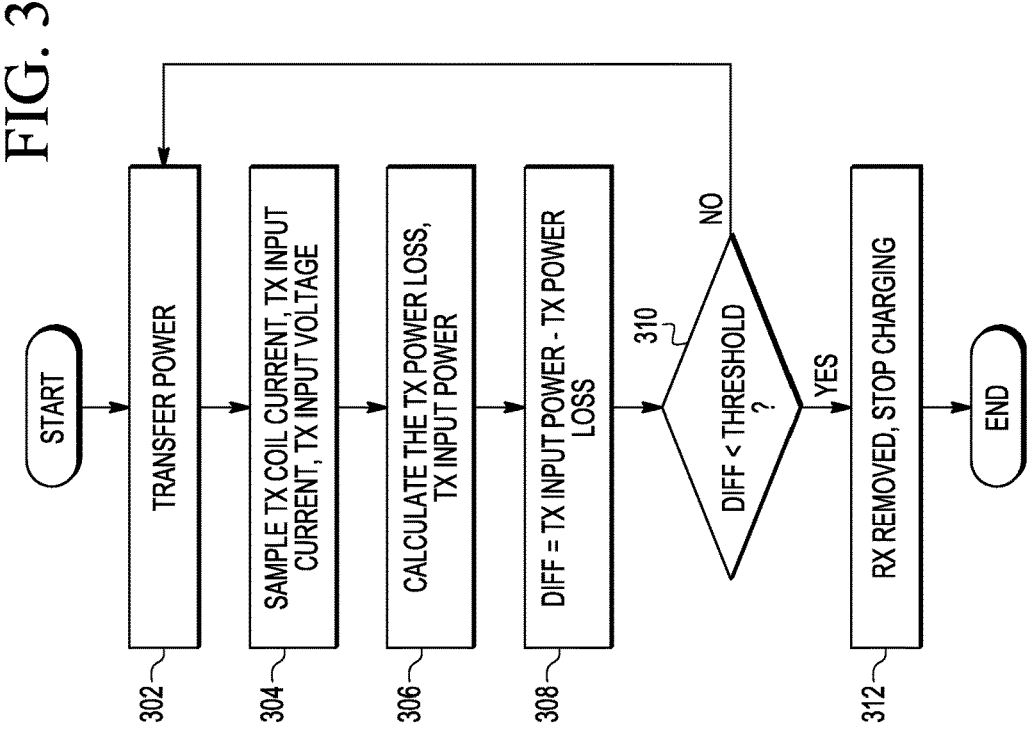
FIG. 4 is a simplified block diagram illustrating the TX circuitry of FIG. 1.

FIG. 4 is a simplified block diagram illustrating the TX circuitry 112 of FIG. 1. As shown in FIG. 4, the TX circuitry 112 comprises an input voltage sensor 402 that senses the voltage of the TX input signal, an input current sensor 404 that senses the current of the TX input signal, a coil current sensor 406 that senses the current in the TX coil 114, and a signal processor 408 that receives those three sensed signals and performs the processing of steps 306-312 of FIG. 3.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A method for detecting removal of a receiver (RX) from a wireless charging system comprising a transmitter (TX) having a TX coil, the method comprising:
   (a) determining TX input power applied to the transmitter;
   (b) determining TX power loss within the transmitter; and
   (c) detecting the removal of the receiver based on a comparison of the determined TX input power and the determined TX power loss.

2. The method of claim 1, further comprising:
   (d) powering down the TX coil in response to detecting the removal of the receiver.

3. The method of claim 1, wherein step (a) comprises:
   (a1) determining TX input current applied to the transmitter;
   (a2) determining TX input voltage applied to the transmitter; and
   (a3) determining the determined TX input power based on the determined TX input current and the determined TX input voltage.

4. The method of claim 1, wherein step (b) comprises:
   (b1) determining TX coil current of the TX coil; and
   (b2) mapping the determined TX coil current to the determined TX power loss.

5. The method of claim 4, wherein the mapping of step (b2) is based on a calibration of the TX power loss as a function of the TX coil current.

6. The method of claim 5, wherein the calibration comprises determining TX input current applied to the transmitter, TX input voltage applied to the transmitter, and the TX coil current of the TX coil at at least one of (i) different operating frequencies, (ii) phase-shift duty cycles, and (iii) input voltages of the transmitter.

7. The method of claim 1, wherein step (c) comprises:
(c1) determining a difference between the determined TX input power and the determined TX power loss;
(c2) comparing the determined difference to a specified threshold value; and
(c3) determining that the receiver has been removed if the determined difference is less than the specified threshold value.

8. The method of claim 1, wherein:
step (a) comprises:
(a1) determining TX input current applied to the transmitter;
(a2) determining TX input voltage applied to the transmitter; and
(a3) determining the determined TX input power based on the determined TX input current and the determined TX input voltage;
step (b) comprises:
(b1) determining TX coil current of the TX coil; and
(b2) mapping the determined TX coil current to the determined TX power loss, wherein:
the mapping of step (b2) is based on a calibration of the TX power loss as a function of the TX coil current; and
the calibration comprises determining TX input current applied to the transmitter, TX input voltage applied to the transmitter, and the TX coil current of the TX coil at different operating frequencies of the transmitter;
step (c) comprises:
(c1) determining a difference between the determined TX input power and the determined TX power loss;
(c2) comparing the determined difference to a specified threshold value; and
(c3) determining that the receiver has been removed if the determined difference is less than the specified threshold value; and
the method further comprises (d) powering down the TX coil in response to detecting the removal of the receiver.

9. A transmitter (TX) for a wireless charging system, wherein the transmitter comprises:
a TX coil that wirelessly transfers power to a receiver of the wireless charging system; and
TX circuitry that powers the TX coil, wherein the TX circuitry detects removal of the receiver by:
(a) determining TX input power to the transmitter;
(b) determining TX power loss within the transmitter; and
(c) detecting the removal of the receiver based on a comparison of the determined TX input power and the determined TX power loss.

10. The transmitter of claim 9, wherein the TX circuitry powers down the TX coil in response to detecting the removal of the receiver.

11. The transmitter of claim 9, wherein the TX circuitry comprises:
(a1) an input current sensor that determines TX input current applied to the transmitter;
(a2) an input voltage sensor that determines TX input voltage applied to the transmitter; and
(a3) a signal processor that determines the determined TX input power based on the determined TX input current and the determined TX input voltage.

12. The transmitter of claim 9, wherein the TX circuitry comprises:
(b1) a coil current sensor that determines TX coil current of the TX coil; and
(b2) a signal processor that maps the determined TX coil current to the determined TX power loss.

13. The transmitter of claim 9, wherein the TX circuitry:
(c1) determines a difference between the determined TX input power and the determined TX power loss;
(c2) compares the determined difference to a specified threshold value; and
(c3) determines that the receiver has been removed if the determined difference is less than the specified threshold value.

14. The transmitter of claim 9, wherein the TX circuitry:
determines TX input current applied to the transmitter;
determines TX input voltage applied to the transmitter;
determines the determined TX input power based on the determined TX input current and the determined TX input voltage;
determines TX coil current of the TX coil;
maps the determined TX coil current to the determined TX power loss, wherein the mapping is based on a calibration of the TX power loss as a function of the TX coil current;
determines a difference between the determined TX input power and the determined TX power loss;
compares the determined difference to a specified threshold value;
determines that the receiver has been removed if the determined difference is less than the specified threshold value; and
powers down the TX coil in response to detecting the removal of the receiver.

15. A wireless charging system comprising a transmitter (TX) and a receiver (TX) that is configured to receive power wirelessly from the transmitter, wherein the transmitter detects removal of the receiver by:
(a) determining TX input power applied to the transmitter;
(b) determining TX power loss within the transmitter; and
(c) detecting the removal of the receiver based on a comparison of the determined TX input power and the determined TX power loss.

16. The system of claim 15, wherein the transmitter powers down the TX coil in response to detecting the removal of the receiver.

17. The system of claim 15, wherein the transmitter comprises:
(a1) an input current sensor that determines TX input current applied to the transmitter;
(a2) an input voltage sensor that determines TX input voltage applied to the transmitter; and
(a3) a signal processor that determines the determined TX input power based on the determined TX input current and the determined TX input voltage.

18. The system of claim 15, wherein the transmitter comprises:
(b1) a coil current sensor that determines TX coil current of the TX coil; and
(b2) a signal processor that maps the determined TX coil current to the determined TX power loss.

19. The system of claim 15, wherein the transmitter:
(c1) determines a difference between the determined TX input power and the determined TX power loss;
(c2) compares the determined difference to a specified threshold value; and
(c3) determines that the receiver has been removed if the determined difference is less than the specified threshold value.

20. The system of claim 15, wherein the transmitter:
determines TX input current applied to the transmitter;

determines TX input voltage applied to the transmitter;
determines the determined TX input power based on the determined TX input current and the determined TX input voltage;
determines TX coil current of the TX coil;
maps the determined TX coil current to the determined TX power loss, wherein the mapping is based on a calibration of the TX power loss as a function of the TX coil current;
determines a difference between the determined TX input power and the determined TX power loss;
compares the determined difference to a specified threshold value;
determines that the receiver has been removed if the determined difference is less than the specified threshold value; and
powers down the TX coil in response to detecting the removal of the receiver.

* * * * *